United States Patent

[11] 3,614,395

[72] Inventor Everett E. Harshman
Dayton, Ohio

[21] Appl. No. 844,587
[22] Filed July 24, 1969
[45] Patented Oct. 19, 1971
[73] Assignee The National Cash Register Company
Dayton, Ohio

[54] HIGH DENSITY STATIC CARD READER
7 Claims, 7 Drawing Figs.

[52] U.S. Cl. .......................................... 235/61.11C, 200/46, 292/342
[51] Int. Cl. .......................................... E05c 17/44, G06k 7/04, H01h 43/08
[50] Field of Search .......................................... 235/61.11, 61.11 A–61.11 J; 200/46; 292/342

[56] References Cited

UNITED STATES PATENTS 3,148,251 9/1964 Burke .......................... 235/66.11 A X
3,472,259 10/1969 Hatch et al. .................. 235/61.11 J X

*Primary Examiner*—Maynard R. Wilbur
*Assistant Examiner*—Thomas J. Sloyan
*Attorneys*—Louis A. Kline, Albert L. Sessler, Jr and Elmer Wargo

ABSTRACT: A compact, manually operated card reader which is especially adaptable for reading punched cards having a high density of information in them. The reader includes first and second printed circuit boards which are brought together for reading a punched card by a pair of wedge members which displace a pressure plate which develops an even pressure on the first printed circuit board in moving it towards the second printed board during a reading operation. The second printed circuit board has resilient, electrically conducting pins projecting therefrom, which pins pass through the holes in a card and are compressed by the first printed circuit board to complete electrical circuits corresponding to holes in the card. The wedge members are actuated by a crank and a connecting lever which is connected to an operating handle on the reader.

PATENTED OCT 19 1971

3,614,395

SHEET 1 OF 2

INVENTOR
EVERETT E. HARSHMAN

BY

HIS ATTORNEYS

INVENTOR
EVERETT E. HARSHMAN
BY
HIS ATTORNEYS

HIGH DENSITY STATIC CARD READER

This invention was made under a contract with the U.S. Government.

BACKGROUND OF THE INVENTION

This invention relates to compact, manually operated card readers which are especially adaptable for reading punched cards having a high density of information in them.

A high-density card is one which has 2 rows of punched data therein compared to 12 rows of punched data in most aperture-type cards.

One of the problems with prior art readers of the above type is that they are frequently bulky and require extensive lever means to effect a reading of a card inserted therein.

In contrast with the above, applicant's reader develops a large force within the confines of a very compact housing, a housing which has a relatively small width when compared to the length of the housing. The lever means for effecting a reading of the card is also very simply constructed.

Some representative prior art manually operated card readers are shown in the following U.S. Pat. Nos.:

3,148,251, which issued Sept. 8, 1964,
3,176,091, which issued Mar. 30, 1965,
3,267,260, which issued Aug. 16, 1966,
3,294,957, which issued Dec. 27, 1966, and
3,437,794, which issued Apr. 8, 1969.

SUMMARY OF THE INVENTION

This invention relates to a manually operated card reader which is especially adaptable for reading punched cards having a high density for information in them. The reader includes a housing having first and second printed circuit board means which are spaced apart within the housing to provide a slot in which a punched card to be read is inserted. The second printed circuit board means includes a plurality of resilient, electrically conducting pins extending therefrom towards said first printed circuit board means. Camming means are provided for moving the first circuit board means towards the second circuit board means, so as to enable the pins to pass through holes in a card being read and to be compressed by said first circuit board means to complete electrical circuits corresponding to the holes in the card. The camming means includes a pressure plate which cooperates with first and second wedge members which are movable between inoperative and operative positions within the housing. A lever means, mounted on the housing and movable between inoperative and operative positions, is used to move the first and second wedge members so as to force the pressure plate and the first printed circuit board means towards the second printed circuit board means to complete the electrical circuits. The first printed circuit board means is removably mounted in the housing, and resilient means are provided to eject the board means when it is not properly inserted in the housing; the same is true for improperly inserted cards. A mechanical interlock means is also provided to prevent moving the lever means to an operative position unless a card is inserted within the reader. When in the operative position, an operating handle, which is part of the lever means, is used to close the mouth of the reader communicating with the card slot.

DESCRIPTION OF THE PREFERRED EMBODIMENT

Figure 4:
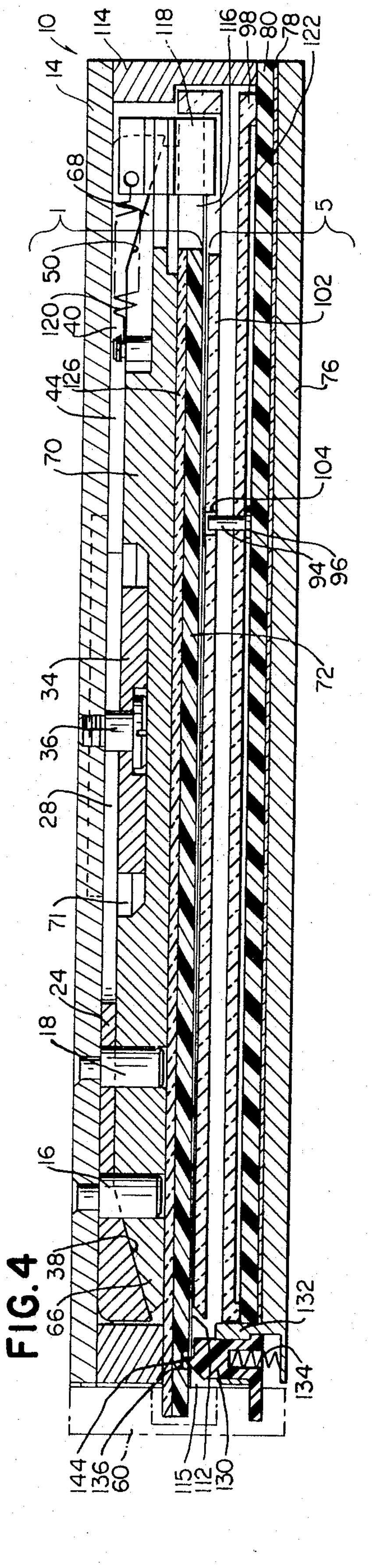
FIG. 4 is a cross-sectional view, taken along the line 4—4 of FIG. 1, showing additional details of the lever-operated wedge means and the printed circuit board means used in conjunction with resilient, electrically conductive contacts to effect the reading of a card inserted in the reader.

The card reader of this invention, designated generally as 10, is composed of two general assemblies which are secured together to form the completed reader, shown in cross section in FIG. 4. One of the general assemblies is called the camming assembly, and the other is called the printed circuit assembly.

Figures 2, 3:
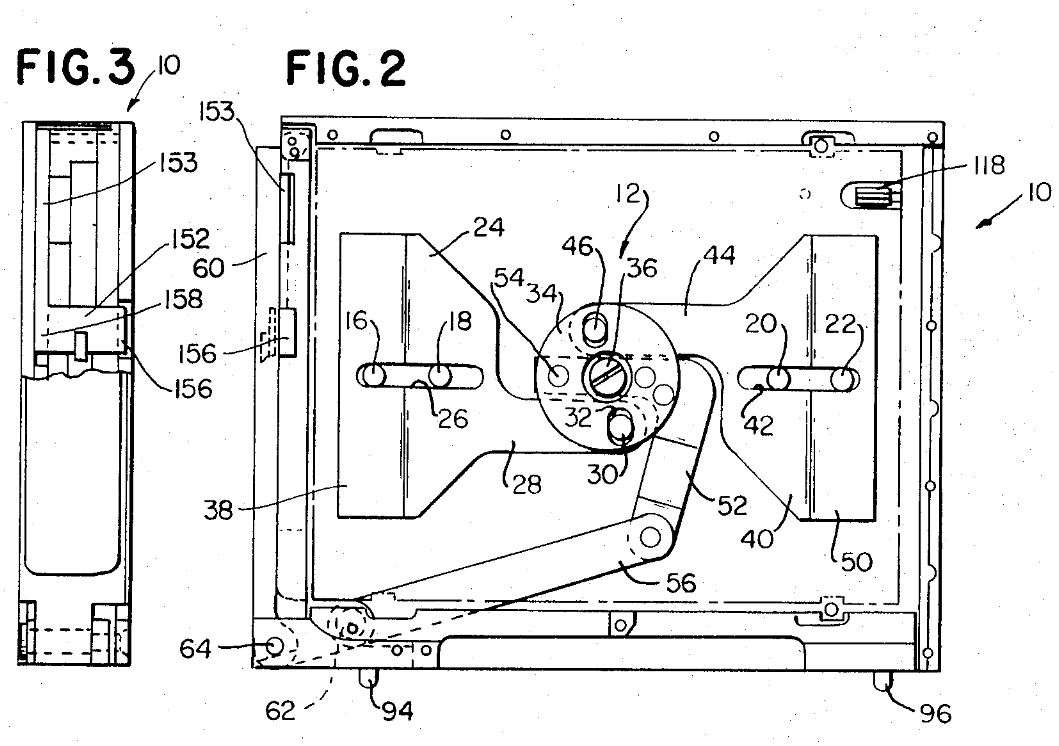
FIG. 2 is a side view, similar to FIG. 1, showing the lever-operated wedge means in an operative, or reading, position.
FIG. 3 is an end view, in elevation, of the left side of the reader as viewed in FIG. 1, showing additional details of the lever-operated wedge means.
Figure 1:
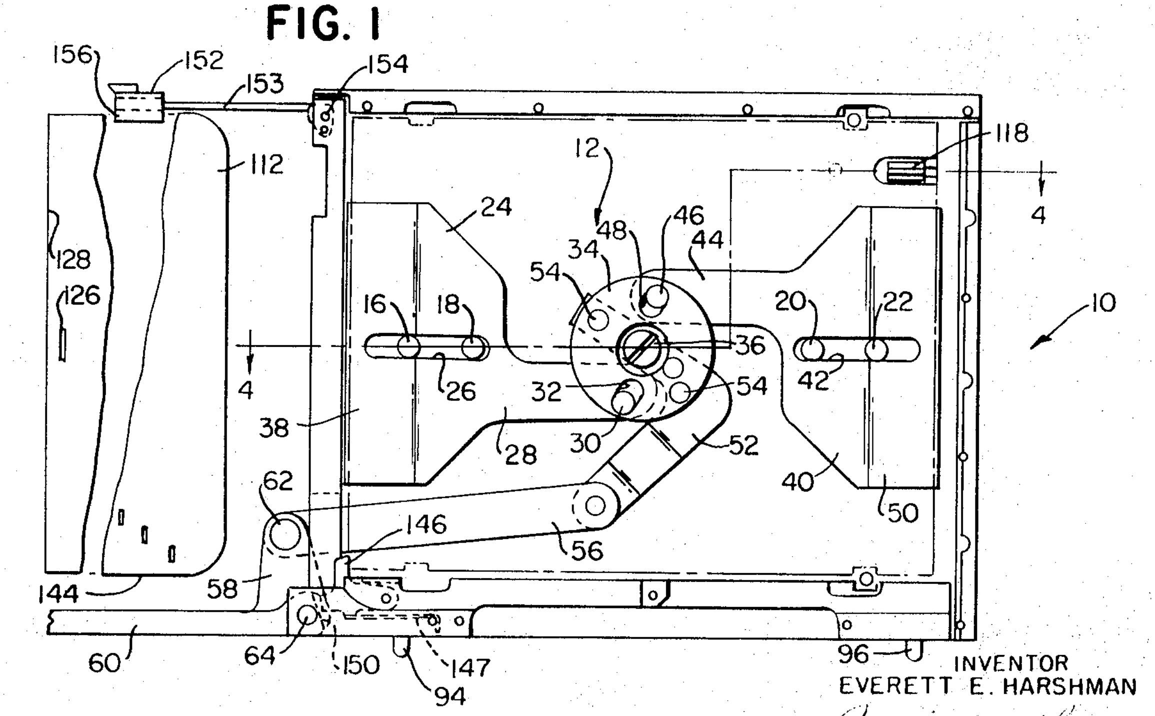
FIG. 1 is a side view, in elevation, of a portion of a manually operated card reader, showing a camming assembly including lever-operated wedge means in an inoperative, or nonreading, position, and generally comprises that portion of the reader included in the bracket marked 1 in FIG. 4.

The camming assembly, designated generally as 12, is shown principally in FIGS. 1, 2, 3, and 4, and it includes generally the elements embraced by the bracket marked 1 in FIG. 4. The camming assembly 12 includes an outer plate 14, which forms an outside wall of the housing of the reader 10. The plate 14 has four guide pins 16, 18, 20, and 22 secured thereto, as shown in FIGS. 1 and 2. A first wedge member 24, which has a slot 26 therein, is mounted on the pins 20 and 22, so that the wedge member 24 is restrained from rotation but is capable of movement along a line joining the centers of these pins. The wedge member 24 has a neck portion 28, which is offset from the line joining the centers of the pins 16 and 18 and which portion has a pin 30 in its end. The pin 30 passes through an elongated slot 32 in the circular hub 34. The hub 34 is rotatably mounted on a shoulder-type fastener 36, which is secured to the outer plate 14. The wedge member 24 has a planar wedge surface 38 near an outer edge portion thereof, and the cross section of this portion is shown in FIG. 4.

The camming assembly 12 also includes a second wedge member 40, which is identical to the wedge member 24. The wedge member 40 has therein a slot 42, which receives the pins 20 and 22 to prevent the rotation of the member 40 while permitting it to be moved in a direction along a line joining the centers of the pins 20 and 22. The wedge member 40 has a neck portion 44, and a pin 46 upstanding from one end thereof, and the pin 46 passes through an elongated slot 48 in the circular hub 34. The pins 16, 18, 20, and 22 and the fastener 36 have centers which lie on a common line, and the centers of the pins 30 and 46 are located equidistantly from this line and on opposite sides thereof. The wedge member 40 has a planar wedge surface 50 near its outer edge portion, and the cross section of this portion is shown in FIG. 4.

The wedge members 24 and 40 are moved towards and away from each other in the following manner. The circular hub 34 is rotated in either direction about the fastener 36 by an L-shaped crank 52. One leg of the crank 52 is fixed to the hub 34 by rivets, like 54, and the remaining leg of the crank is pivotally joined to one end of a link 56. The remaining end of the link 56 is pivotally joined to one leg 58 of a handle 60 by a pin 62. The leg 58 is aligned generally perpendicular to the handle 60, which is pivotally secured to the outer plate 14 by a pin 64.

When the handle 60 is in the position shown in FIG. 1, the wedge members 24 and 40 are in the nonreading, or inoperative, position, in which they are farthest apart. During this time, a card to be read may be inserted into or withdrawn from the reader. After a card is inserted into the reader and a reading operation is to be performed, the handle 60 is rotated clockwise (as viewed in FIG. 1) about the pin 64, causing the link 56 to rotate the crank member 52 counterclockwise (as viewed in FIG. 1) about the longitudinal axis of the fastener 36. Because the circular hub 34 is secured to the crank 52, it will rotate also counterclockwise about the axis of the fastener 36. When the circular hub 34 rotates counterclockwise (as viewed in FIGS. 1 and 2), the wedge members 24 and 40 will be pulled towards each other by the pins 30 and 46 cooperating with the slots 32 and 48, respectively. The slots 32 and 48 are arranged on the circular hub 34 to cooperate with the crank 52 to provide an "overcenter" relationship for toggle action to keep the wedge members 24 and 40 in the operative position, shown in FIG. 2, until the handle 60 is rotated counterclockwise (as viewed in FIG. 2) to the position shown in FIG. 1. The wedge members 24 and 40 are thereby driven positively in each direction of travel.

The purpose of moving the wedge members 24 and 40 to the operative position, shown in FIG. 2, is best explained in connection with FIG. 4, which shows the wedge members in their spaced-apart, or inoperative, position. When the wedge members 24 and 40 are pulled towards each other by the handle 60, the wedge surfaces 38 and 50, respectively, thereof will contact mating wedge surfaces 66 and 68 on a pressure plate 70 and force the plate 70 away from the outer plate 14 while maintaining a parallel relationship therewith. The pressure plate 70 has a recess 71 to accommodate the hub 34. The pressure plate 70 is relatively thick in cross section for most of its length, as viewed in FIG. 4, and it becomes narrower in cross section near the wedge surfaces 66 and 68 to accommodate the wedge members 24 and 40. By this construction, a very uniform pressure is applied over the entire area of the plate 70 while maintaining the physical size of the plate and wedge members and the resulting reader 10 to compact proportions. FIG. 4 is accurately proportioned, so that it is apparent that the reader 10 is very narrow in width compared to its length. The uniform pressure applied by the pressure plate 70 is required for use with a printed circuit means used in reading a punched card inserted in the reader 10.

Figure 5:
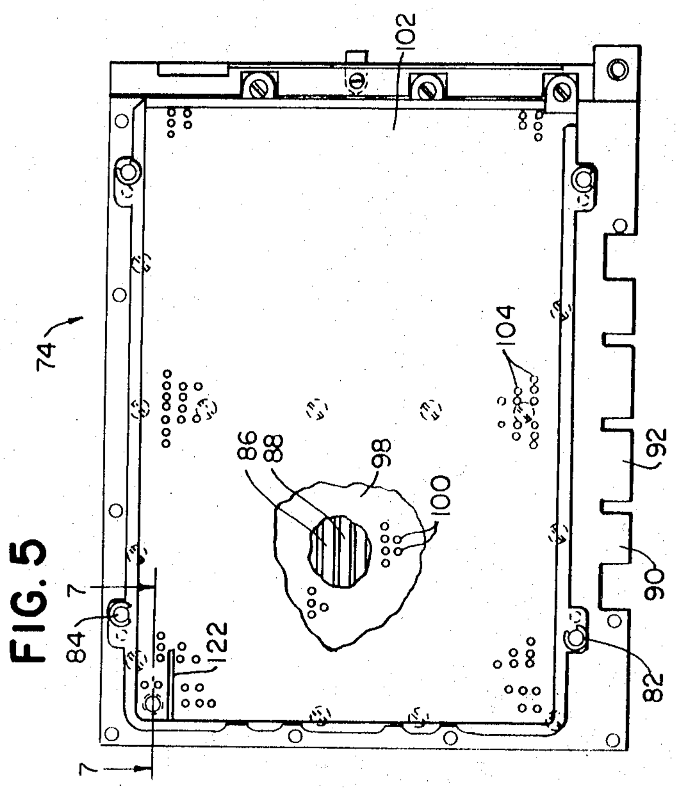
FIG. 5 is an elevational view of a circuit assembly unit which is secured to one of the outer plates of the reader and comprises the section of elements embraced by the bracket marked 5 in FIG. 4.

The printed circuit means (FIG. 4) alluded to includes a removable printed circuit board 72 and a printed circuit assembly designated generally as 74 in FIG. 5, which assembly includes generally those elements embraced by the bracket marked 5 in FIG. 4.

The printed circuit assembly 74 is constructed in the following manner. It includes an outer plate 76, to which a layer 78 (FIG. 4) of conventional plastic insulation is secured. A stationary printed circuit board 80 has locating holes therein which receive the locating pins like 82 and 84 (secured to the plate 76) to orient the board within the reader 10. The circuit board 80 has electrical conductor strips, like 86, 88, which are placed in parallel relationship thereon on the side thereof which faces the center of the reader. The board 80 also has electrical circuit connection patterns on its opposite side (facing the outer plate 76). The connecting leads (not shown) for the various connection patterns of the board 80 are located on the terminal connectors, like 90, 92 (FIG. 5), which provide the means for connecting the reader 10 with an external utilization device (not shown). There are coupling pins 94, 96 (FIG. 1), on the bottom of the reader 10, which facilitate the location of the reader relative to the utilization device.

The printed circuit assembly 74 also includes a plurality of resilient, electrically conductive, compressible contact pins like the pin 94 (FIG. 4). Each of the pins 94 has a base portion 96, which engages its associated conductor strip, like 86, 88, shown in FIG. 5. The pins 94 are aligned in rows corresponding to their associated conductor strips, like 86, and their base portions 96 may be integrally joined for the pins located on a particular conductor strip. Because the specific nature of the interconnection pattern on the printed circuit board 80 is not important to this invention, it may be conventional.

Figure 6:
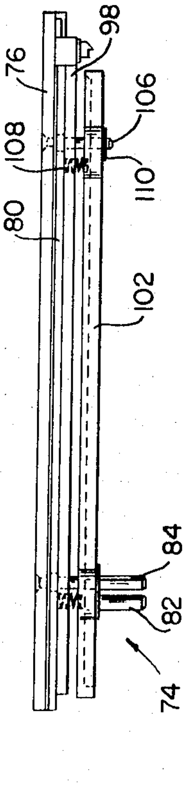
FIG. 6 is a plan view, in elevation, of the top of the circuit assembly as viewed from FIG. 5.

The compressible pins 94 have a portion of their shafts passing through an apertured support block 98 (FIGS. 4, 5, and 6), which locates and supports the individual pins 94. The block 98 has therein apertures 100, which are arranged in an array for the specific design requirements of the reader. A protector plate 102 is utilized to protect the pins 94 when a card to be read inserted into the reader 10. The plate 102 has apertures 104, which are aligned with the apertures 100 in the block 98. The plate 102 is maintained in the spaced parallel relationship with the support block 98, shown in FIG. 6, by guide pins 106 and springs, like 108, which urge the protector plate 102 away from the support block 98. The protector plate 102 is limited in its movement away from the block 98 by convenient fasteners, like C-shaped washers, with one being secured to each of the pins 106. The limiting position of the protector plate 102 relative to the block 98 is so designed that the tips of the contact pins 94 lie within their associated apertures 104 in the protector plate 102, as shown in FIG. 4. With such a design arrangement, a card may be inserted into the reader 10 without damaging the contact pins 94. When in the position shown in FIG. 4, the protector plate 102 is also parallel to and spaced from the removable printed circuit board 72, so as to provide a slot to receive the punched card 112. The contact pins 94 are made of compressible silicone, which has therein filler flakes or balls of conductor material, like copper or silver, so as to make the contact pins 94 electrically conducting.

The printed circuit assembly 74 is secured to the camming assembly 12 to provide the assembled reader 10 shown in FIG. 4. Suitable blocks, like the block 114 (FIG. 4), are used as spacers and as closing sides of the reader 10, as is conventionally done, to keep out contaminants like dirt and dust.

The end of the reader 10 into which a punched card and the removable printed circuit board 72 are inserted is the left side thereof, as viewed in FIGS. 1, 2, and 4. As stated earlier, the handle 60 must be moved to the position shown in FIG. 1 to permit entry of a card and the removable printed circuit board 72.

Figure 7:
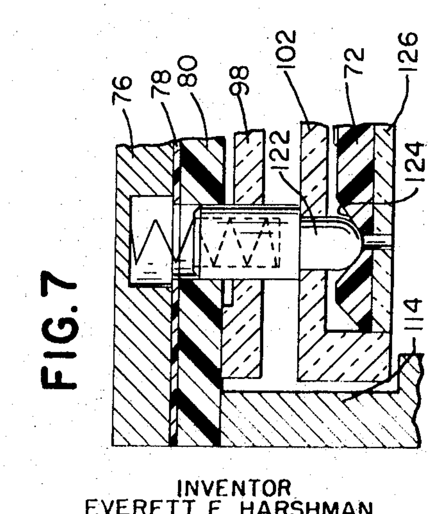
FIG. 7 is a cross-sectional view, taken along the line 7—7 of FIG. 5, showing a means for releasably holding a removable printed circuit board within the card reader.

The card reader 10 is operated in the following manner. With the handle 60 in the position shown in FIG. 1, an opening 115 (FIG. 4) is exposed, permitting the printed circuit board 72 to be inserted therein. A check on proper alignment of the printed circuit board 72 within the reader 10 is affected by a slot 116 (FIG. 4) in its leading edge, which slot cooperates with a slide member 118, which is biased for movement towards the opening 115 by a spring 120. The slot 116 is similar to the slot 122 occurring in the protective plate 102. If the printed circuit board 72 is not properly oriented prior to insertion within the reader, the slide 118 will engage a misoriented edge of the circuit board 72 and push the slide 118 towards the block 114, thereby tensioning the spring 120. When the improperly inserted circuit board 72 is released, it will be forced toward the opening 115 of the reader by the slide 118 (moved by the spring 120) and "pop out" or extend slightly out of the opening 115, thereby giving a visual indication of an improperly inserted circuit board. When a circuit board 72 is properly inserted in the card reader 10, the slot 116 will be aligned with the slide member 118, so that the circuit board 72 will not move the slide member towards the block 114, to become tensioned. A conventional spring-loaded detent member 122 (FIG. 7) engages a recess 124 on a properly inserted removable circuit board 72 to releasably hold the board in place. The circuit board 72 has a layer of insulating plastic 126 on the side facing the pressure plate 70 to insulate it from the plate 70.

A punched card 172 is inserted into the reader 10 when the handle 60 is in the position shown in FIG. 1, in which position the opening 115 into the reader is exposed. The card 112 may be of the "high density" or the "double-punched" variety to increase the data contained therein. The card 112 has certain holes therein which cooperate with selected contact pins 94 to provide a conventional electrical interlock to verify that the card 112 has been properly inserted into the reader. In addition, the card 112 has a double-punched hole, 126 on its trailing edge 128, which cooperates with a plunger 130 (FIG. 4) to provide a mechanical check on whether or not a card is properly inserted in the reader 10. The plunger 130 is slidably mounted in a portion 132 (FIG. 4) of the outer plate 76 and is resiliently urged by a spring 134 towards a notch 136 in the removable printed circuit board 72. When a card 112 is properly inserted into the reader 10, the leading edge 138 thereof pushes against the slide 118, and the notch 126 in the trailing edge 128 of the card becomes aligned with the notch 136 in the circuit board 72, permitting a tip 140 on the plunger 130 to pass through the notch 126 in the card and to enter the notch 136, thereby preventing movement of the card 112 out of the reader 10. The tip 140 of plunger 130 is chamfered on the side thereof which faces the opening 115 to facilitate entry of a card 112 and has a shoulder on the opposite side to prevent the card from being pushed out by the tensioned slide member 118. To withdraw a card from the reader 10, the plunger 130 is merely moved in an axial direction towards the outer plate 76 by an operator's finger, which pushes a projecting lever 142 on the plunger 130 supplied for this purpose.

Assuming that a removable printed circuit board 72 and a card 112 are properly inserted in the card reader 10 when its handle 60 is in the position shown in FIG. 1, the reader 10 is ready to be closed for the reading operation. The lower edge 144 of the card 112 pushes a pawl member 146 downwardly (as viewed in FIG. 1) when it is inserted into the reader, causing the pawl member 146 to be rotated counterclockwise (against the bias of a restoring spring 147) about a pivot pin 148 secured to the outer plate 14. The counterclockwise rotation of the pawl member 146 moves one end thereof away from a shoulder 150 on handle 60, permitting the handle 60 to be rotated clockwise (as viewed in FIG. 1), when the reading operation is to be affected. The pawl member 146 cooperates with the handle 60 to prevent the handle from being moved to the read position unless a card is present in the reader 10.

An optional clamping member 152 (FIGS. 1, 2, and 3) may be used to help secure the outer plates 14 and 76 together at the end of the reader containing the opening 115 to prevent the outward bowing thereof. If the number of pins 94 becomes great, the force required to compress them to effect a reading may become so great as to cause the mentioned bowing. In actual practice, the force developed on the pressure plate 70 is about 300 to 400 pounds with no apparent bowing of the outer plates 14 and 76. However, to provide for such a possible bowing contingency, the clamping member 152 may be used. The clamping member 152 is a U-shaped member supported on one end of an arm 153, whose remaining end is pivotally joined to the outer plate 14 by a pin 154. The clamping member 152 has sides 156 and 158, which embrace the outer plates 70 and 14, respectively, when the member 152 is rotated counterclockwise (as viewed in FIG. 1) from the position shown therein to the position shown in FIG. 2. Wen the handle 60 is in the position shown in FIG. 2, and the clamping member 152 is used, it is nestled in an appropriate recess in the handle 60.

What is claimed is:

1. In a card reader having:

a housing, first and second printed circuit board means spaced apart in said housing to define a card-receiving space therebetween, and a plurality of resilient, electrically conducting pins extending from said second printed circuit board means towards said first printed circuit board means, the improvement comprising camming means for moving said first circuit board means towards said second circuit board means so as to enable said pins to pass through holes in a card in the housing and to be compressed by said first circuit board means to complete electrical circuits corresponding to said holes in said card;

said camming means comprising:

a pressure plate positioned adjacent to said first printed circuit board means, and having first and second cam surfaces thereon, first and second wedge members movable between inoperative and operative positions within said housing and adapted to cooperate with said first and second cam surfaces, respectively;

a plurality of locating pins having aligned centers secured to said housing;

said first and second wedge members each having slots therein to receive at least two of said locating pins enabling said wedge members to be moved towards and away from each other along a line coincident with the centers of the locating pins; and lever means mounted on said housing and movable between inoperative and operative positions;

said lever means, when moved to said operative position, being adapted to move said first and second wedge members to said operative position so as to force said pressure plate and said first printed circuit board means towards said second printed circuit board means to complete said electrical circuits;

said lever means including an operating handle pivotally joined to said housing; and crank means operatively connected to said handle and said first and second wedge members for moving them towards and away from each other.

2. The improvement as claimed in claim 1 in which said first and second wedge members have first and second planar cam surfaces respectively which engage respectively said first and second cam surfaces on said pressure plate, said first and second wedge members each having an inner end with a pin upstanding therefrom;

said crank means including a hub member rotatably mounted in said housing and having slots therein to receive said pins on said inner ends; a crank member for rotating said hub member in either direction; and a link having one end pivotally joined to said crank member and the remaining end pivotally joined to said operating handle.

3. The improvement as claimed in claim 2 in which the pins on said inner ends are equidistantly located from the lien coincident with the centers of said locating pins.

4. The improvement as claimed in claim 3 further comprising pawl means cooperating with said operating handle and a card inserted in the card reader so as to enable said operating handle to be moved to said operative position only when a card is present in said reader.

5. The improvement as claimed in claim 3 further comprising ejector means cooperating with a card to be read so as to partially eject any card not oriented in the reader in a predetermined manner.

6. The improvement as claimed in claim 3 in which said housing has opposing sides and an open end communicating with said card-receiving space, and further includes a clamp member pivotally joined to said housing and adapted to embrace said opposing sides of said housing at said open end to maintain said sides in parallel relationship.

7. The improvement as claimed in claim 3 in which said operating handle is adapted to close said open end of said housing when the handle is moved to the operative position, and in which said housing has a narrow width as measured between said opposing sides when compared to the length of the housing.